United States Patent
Kanaya

(10) Patent No.: US 10,805,472 B2
(45) Date of Patent: Oct. 13, 2020

(54) TERMINAL APPARATUS, INFORMATION PROCESSING SYSTEM, AND INFORMATION TRANSMISSION METHOD

(71) Applicant: RICOH COMPANY, LTD., Tokyo (JP)

(72) Inventor: Mitsuhisa Kanaya, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 454 days.

(21) Appl. No.: 14/633,858

(22) Filed: Feb. 27, 2015

(65) Prior Publication Data

US 2015/0249749 A1 Sep. 3, 2015

(30) Foreign Application Priority Data

Feb. 28, 2014 (JP) ................................ 2014-038930

(51) Int. Cl.
*H04M 3/56* (2006.01)
*H04L 12/18* (2006.01)
*H04M 7/00* (2006.01)

(52) U.S. Cl.
CPC .......... *H04M 3/567* (2013.01); *H04L 12/189* (2013.01); *H04L 12/1818* (2013.01); *H04M 7/0027* (2013.01)

(58) Field of Classification Search
None
See application file for complete search history.

(56) References Cited

U.S. PATENT DOCUMENTS 6,317,777 B1 * 11/2001 Skarbo ................... G06Q 10/10
709/204
6,573,926 B1 * 6/2003 Ichimura .................. H04N 7/15
348/14.08
7,813,410 B1 * 10/2010 Akyildiz ................... G06F 1/08
375/130

(Continued)

FOREIGN PATENT DOCUMENTS

JP 2000-23133 1/2000
JP 3368833 1/2003

*Primary Examiner* — Christopher T Wyllie
(74) *Attorney, Agent, or Firm* — Xsensus LLP

(57) ABSTRACT

A terminal apparatus has a first setting and a second setting that includes a receiver receiving first transmission information and second transmission information including a part of the information, a transmission information storage storing transmission information including the first and the second transmission information, a display processor displaying the first transmission information based on information specified by the information processing apparatus in the first setting, and displaying the second transmission information based on an operation performed on the terminal apparatus in the second setting, and a transmission storage controller controlling the transmission information storage to store the first transmission information based on the specified information in a first storage area for a first setting use in the transmission information storage, and to store the second transmission information based on the operation in a second storage area for a second setting use in the transmission information storage.

15 Claims, 15 Drawing Sheets

(56) References Cited

U.S. PATENT DOCUMENTS

| | | | | |
|---|---|---|---|---|
| 2002/0103864 A1* | 8/2002 | Rodman | ............... | H04L 61/20 |
| | | | | 709/204 |
| 2003/0167281 A1* | 9/2003 | Cohen | ............... | G06Q 10/10 |
| 2005/0216847 A1* | 9/2005 | Zhu | ............... | H04L 67/10 |
| | | | | 715/751 |
| 2008/0098295 A1* | 4/2008 | Nelson | ............... | H04L 65/1006 |
| | | | | 715/233 |
| 2008/0162551 A1* | 7/2008 | Geyer | ............... | G06Q 10/10 |
| 2008/0256463 A1* | 10/2008 | Li | ............... | H04N 21/234309 |
| | | | | 715/756 |
| 2010/0037151 A1* | 2/2010 | Ackerman | ............... | H04L 65/4015 |
| | | | | 715/753 |
| 2010/0073458 A1* | 3/2010 | Pace | ............... | H04N 21/4788 |
| | | | | 348/14.16 |
| 2014/0244721 A1* | 8/2014 | Taine | ............... | H04L 67/1095 |
| | | | | 709/203 |

* cited by examiner

FIG.6

CLIENT INFORMATION

| CLIENT ID | DIVIDING UNIT | DATA FORMAT | SIZE | CACHE INFORMATION |
|---|---|---|---|---|
| 1 | ONE PAGE UNIT | JPEG FORMAT | 1024 × 768 PIXELS | CACHE FOR 2 PAGES ALGORITHM A |
| ... | ... | ... | ... | ... |

TERMINAL APPARATUS, INFORMATION PROCESSING SYSTEM, AND INFORMATION TRANSMISSION METHOD

BACKGROUND OF THE INVENTION

1. Field of the Invention

The disclosures discussed herein relate to a terminal apparatus, an information processing system, and an information transmission method.

2. Description of the Related Art

There is generally known in the related art a conference system in which material such as a document for use in a conference is distributed via a transmission line differing from a transmission line via which real-time data such as video data are transmitted so as to efficiently distribute the conference material without adversely affecting the transmission of real-time data (see Patent Document 1).

Such a conference system may be configured to start a conference that uses material for use in the conference such as a document after the conference material has been transmitted from a server apparatus to terminal apparatuses. Recently, data sizes managed by such a conference system tend to increase due to an increase in types of materials (information) handled or types of terminal apparatuses serviced by the conference system. Hence, the related art conference system is configured to start the conference after all the information has been transmitted to the terminal apparatuses.

Meantime, the terminal apparatuses may have a setting for displaying information specified by the server apparatus (a synchronous mode) and a setting for temporarily displaying information other than the information specified by the server apparatus (an asynchronous mode). Such terminal apparatuses are assumed to be used in the configuration of the conference system that starts a conference after all the information for use in the conference has been transmitted to the terminal apparatuses.

Thus, such information processing systems such as a conference system are generally configured to be in a standby mode until all the information has been transmitted from the information processing apparatus such as a server apparatus to the terminal apparatuses.

RELATED ART DOCUMENTS PATENT DOCUMENT

Patent Document 1: Japanese Laid-open Patent Publication No. 2000-23133

SUMMARY OF THE INVENTION

Accordingly, it is a general object in one embodiment of the present invention to provide a terminal apparatus, an information processing system, and an information transmission method capable of implementing a setting for temporarily displaying information other than information specified by an information processing apparatus without waiting until all the information has been transmitted from the information processing apparatus to the terminal apparatus that substantially obviates one or more problems caused by the limitations and disadvantages of the related art.

In one aspect of the embodiment, there is provided a terminal apparatus having a first setting for displaying information specified by an information processing apparatus and a second setting for displaying information other than the information specified by the information processing apparatus. The terminal apparatus includes a receiver configured to receive first transmission information and second transmission information that are converted from the information specified by the information processing apparatus, the first transmission information including a first part to be displayed first, the second transmission information including a part of the information; a transmission information storage configured to store transmission information including the first and the second transmission information received from the receiver in a storage area thereof; a display processor configured to display the first transmission information based on information specified by the information processing apparatus in the first setting, and to display the second transmission information based on an operation performed on the terminal apparatus in the second setting; and a transmission storage controller configured to control the transmission information storage to store the first transmission information based on the information specified by the information processing apparatus in a first storage area for a first setting use of the storage area in the transmission information storage, and to control the transmission information storage to store the second transmission information based on the operation performed on the terminal apparatus in a second storage area for a second setting use of the storage area in the transmission information storage.

Other objects, features and advantages of the present invention will become more apparent from the following detailed description when read in conjunction with the accompanying drawings.

BRIEF DESCRIPTION OF THE DRAWINGS

FIG. 6 is a configuration diagram illustrating an example of client information;

DETAILED DESCRIPTION OF THE PREFERRED EMBODIMENTS

In the following, an embodiment is described in detail. Note that in the embodiment described below, a conference system is illustrated as an example of an information processing system. Note also that conference material is an example of information to be transmitted.

First Embodiment

System Configuration

Figure 1:
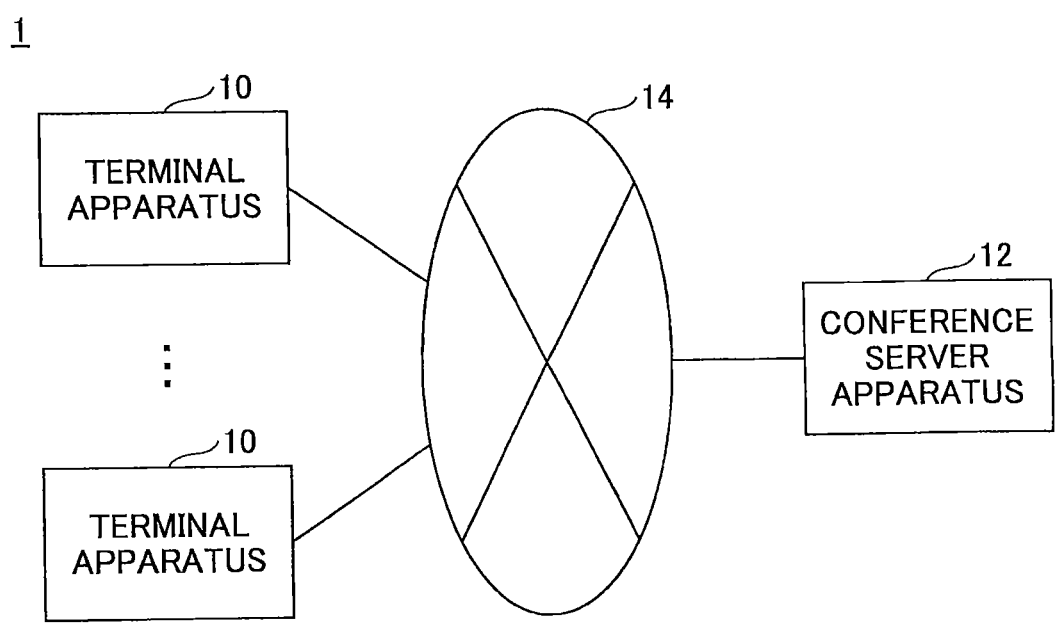
FIG. 1 is a configuration diagram illustrating an example of a conference system according to an embodiment.

FIG. 1 is a configuration diagram illustrating an example of a conference system according to an embodiment. As illustrated in FIG. 1, a conference system 1 according to an embodiment includes one or more terminal apparatuses 10 (hereinafter may generically be called a "terminal apparatus 10"), and a conference server apparatus 12 that are connected via a wired or wireless network 14.

Note that the conference server apparatus 12 may be implemented by software or a service that operates on a computer. Further, the conference server apparatus 12 may be implemented by software or a service that operates on one or more computers. For example, the conference server apparatus 12 may be implemented in a form of a so-called cloud service.

The terminal apparatus 10 is a device operated by an attendee of a conference. The terminal apparatus 10 may be a personal computer (PC); a tablet terminal; a mobile information terminal such as a smartphone, a mobile phone, and a personal digital assistant (PDA); a display apparatus such as an electronic whiteboard; a projection apparatus such as a projector; and a conference-only terminal. The terminal apparatus 10 has installed a conference application configured to receive (download) conference material from the conference server apparatus 12 to display the conference material synchronously or asynchronously.

Note that the setting of the terminal apparatus 10 to display the conference material synchronously is called a synchronous mode. In the synchronous mode, the terminal apparatuses 10 attending the same conference perform identical processes (e.g., display identical pages of the conference material) specified by the conference server apparatus 12.

Note that the setting of the terminal apparatus 10 to display the conference material asynchronously is called an asynchronous mode. In the asynchronous mode, each of the terminal apparatuses 10 independently performs its own process. Hence, even though the terminal apparatuses 10 are attending the same conference, the terminal apparatuses 10 may be able to temporarily display pages of the conference material other than pages specified by the conference server apparatus 12. The synchronous mode and the asynchronous mode may also be called a "sharing mode" and a "personal mode", respectively. Further, the synchronous mode and the asynchronous mode may also be called a "server specified mode" and a "client own mode", respectively.

The conference server apparatus 12 is configured to process information associated with a conference. The conference server apparatus 12 is configured to transmit conference material to each of the terminal apparatuses 10. Note that examples of the conference server apparatus 12 include a workstation (WS), a PC, and the like. The conference server apparatus 12 and each of the terminal apparatuses 10 may mutually communicate with each other with communications protocols such as TCP/IP. The conference server apparatus 12 is configured to save registered conference information, user information, and the like. The conference server apparatus 12 is configured to save the conference material, and the like registered (uploaded) by the terminal apparatuses 10.

Hardware Configuration

Figure 2:
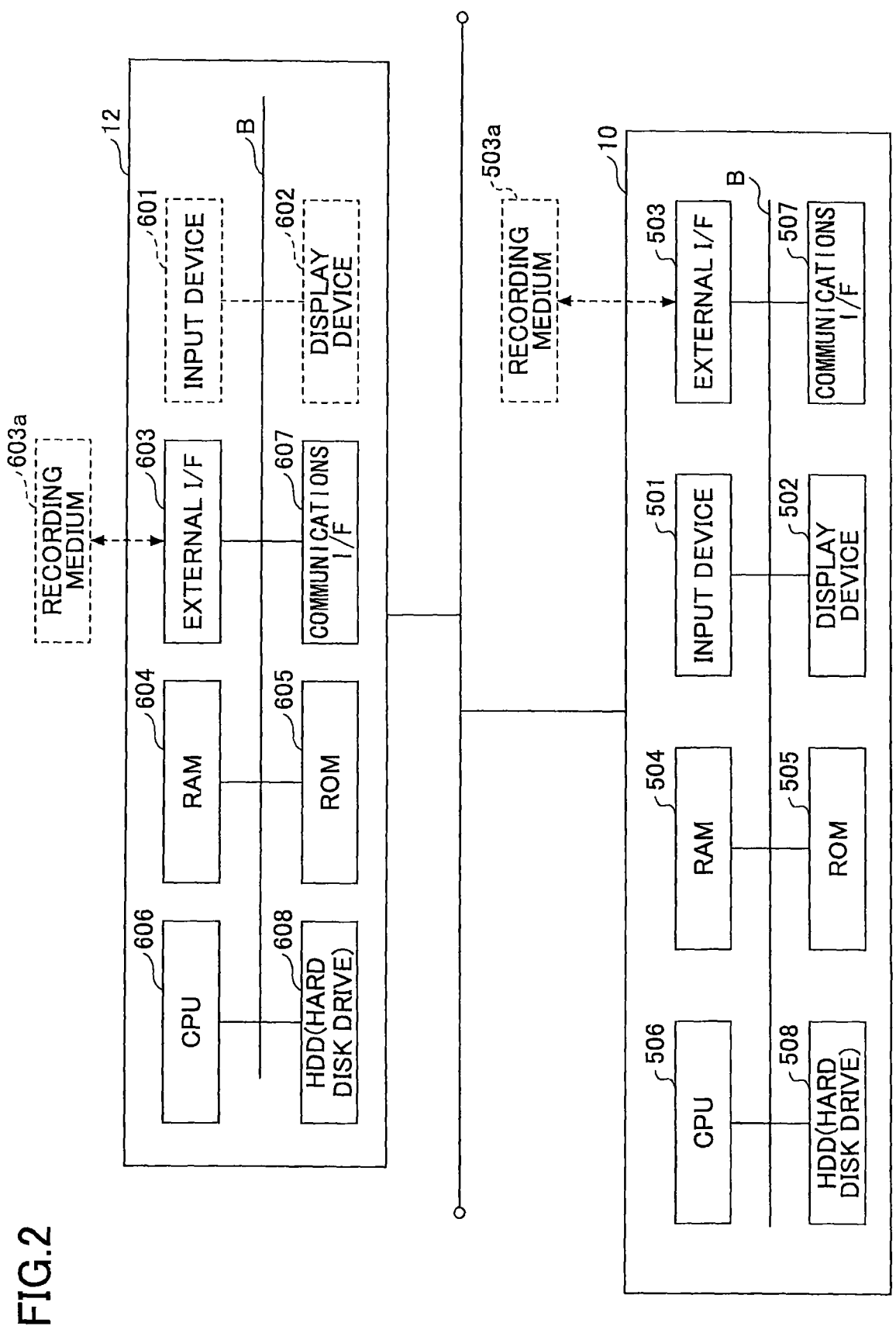
FIG. 2 is a hardware configuration diagram illustrating an example of a computer forming a conference system according to the embodiment.

The terminal apparatus 10 and the conference server apparatus 12 may be implemented by respective hardware configurations illustrated in FIG. 2.

FIG. 2 is a hardware configuration diagram illustrating an example of a computer forming the conference system 1 according to the embodiment. The terminal apparatus 10 illustrated in FIG. 2 includes an input device 501, a display device 502, an external I/F 503, random access memory (RAM) 504, read-only memory (ROM) 505, a central processing unit (CPU) 506, a communications I/F 507, a hard disk drive (HDD) 508, and the like that are connected to one another via a bus B. Note that the terminal apparatus 10 may also be configured to include a camera, a microphone, a speaker, and the like.

The input device 501 includes a keyboard, a mouse, and a touch panel, and is configured to input various operation signals into the terminal apparatus 10. The display device 501 includes a display, and the like, and is configured to display results of processes performed by the terminal apparatus 10. The communications I/F 507 serves as an interface configured to connect the terminal apparatus 10 to the network 14. Hence, the terminal apparatus 10 may be able to perform data communications with the conference server apparatus 12 via the communications I/F 507.

The HDD 508 serves as a non-volatile storage device configured to store programs and data. Examples of the stored programs and data include an operating system (OS) serving as basic software that is configured to control the terminal apparatus 10 as a whole, application software that is configured to provide various functions on the OS, and the like.

The external I/F 503 serves as an interface with respect to external devices. Examples of the external devices include a recording medium 503a, and the like. Hence, the terminal apparatus 10 may be able to read the recording medium 503a or write on the recording medium 503a via the external I/F 503. Examples of the recording medium 503a include a flexible disk, a compact disk (CD), a digital versatile disk (DVD), a secure digital (SD) card, universal serial bus (USB) memory, and the like.

The ROM 505 is non-volatile semiconductor memory (a storage device) configured to retain programs or data even when power supply is turned off. The ROM 505 is configured to store programs and data such as BIOS that is executed at startup of the terminal apparatus 10, OS settings, network settings, and the like. Further, the RAM 504 is volatile semiconductor memory configured to temporarily store programs and data.

The CPU 506 is a processor configured to implement control over the terminal apparatus 10 or functions of the terminal apparatus 10 by loading programs and data in the RAM 504 from a storage device such as the ROM 505 and the HDD 508 to execute processes.

The terminal apparatus 10 may be able to implement later-described various processes by executing programs in the above-described hardware configuration.

The conference server apparatus 12 illustrated in FIG. 2 includes an input device 601, a display device 602, an external I/F 603, RAM 604, ROM 605, a CPU 606, a communications I/F 607, an HDD 608, and the like that are connected to one another via a bus B. Note that the input device 601 and the display device 602 may optionally be connected when these devices are necessary.

The input device 601 includes a keyboard, and a mouse, and is configured to input various operation signals into the conference server apparatus 12. The display device 602 includes a display, and the like, and is configured to display results of processes performed by the conference server apparatus 12.

The communications I/F 607 serves as an interface configured to connect the conference server apparatus 12 to the network 14. Hence, the conference server apparatus 12 may be able to perform data communications with the terminal apparatus 10 via the communications I/F 607.

The HDD 608 serves as a non-volatile storage device configured to store programs and data. Examples of the stored programs and data include an operating system (OS) serving as basic software that is configured to control the conference server apparatus 12 as a whole, application software that is configured to provide various functions on the OS, and the like.

The external I/F 603 serves as an interface with respect to external devices. Examples of the external devices include a recording medium 603*a*, and the like. Hence, the conference server apparatus 12 may be able to read the recording medium 603*a* or write on the recording medium 603*a* via the external I/F 603. Examples of the recording medium 603*a* include a flexible disk, a compact disk (CD), a digital versatile disk (DVD), a secure digital (SD) card, universal serial bus (USB) memory, and the like.

The ROM 605 is non-volatile semiconductor memory (a storage device) configured to retain programs or data even when power supply is turned off. The ROM 605 is configured to store programs and data such as BIOS that is executed at startup of the conference server apparatus 12, OS settings, network settings, and the like. The RAM 604 is volatile semiconductor memory configured to temporarily store programs and data.

The CPU 606 is a processor configured to implement control over the conference server apparatus 12 as a whole or functions of the conference server apparatus 12 by loading programs and data in the RAM 605 from a storage device such as the ROM 605 and the HDD 608 to execute processes.

The conference server apparatus 12 may be able to implement later-described various processes by executing programs in the above-described hardware configuration.

Software Configuration

Figure 3:
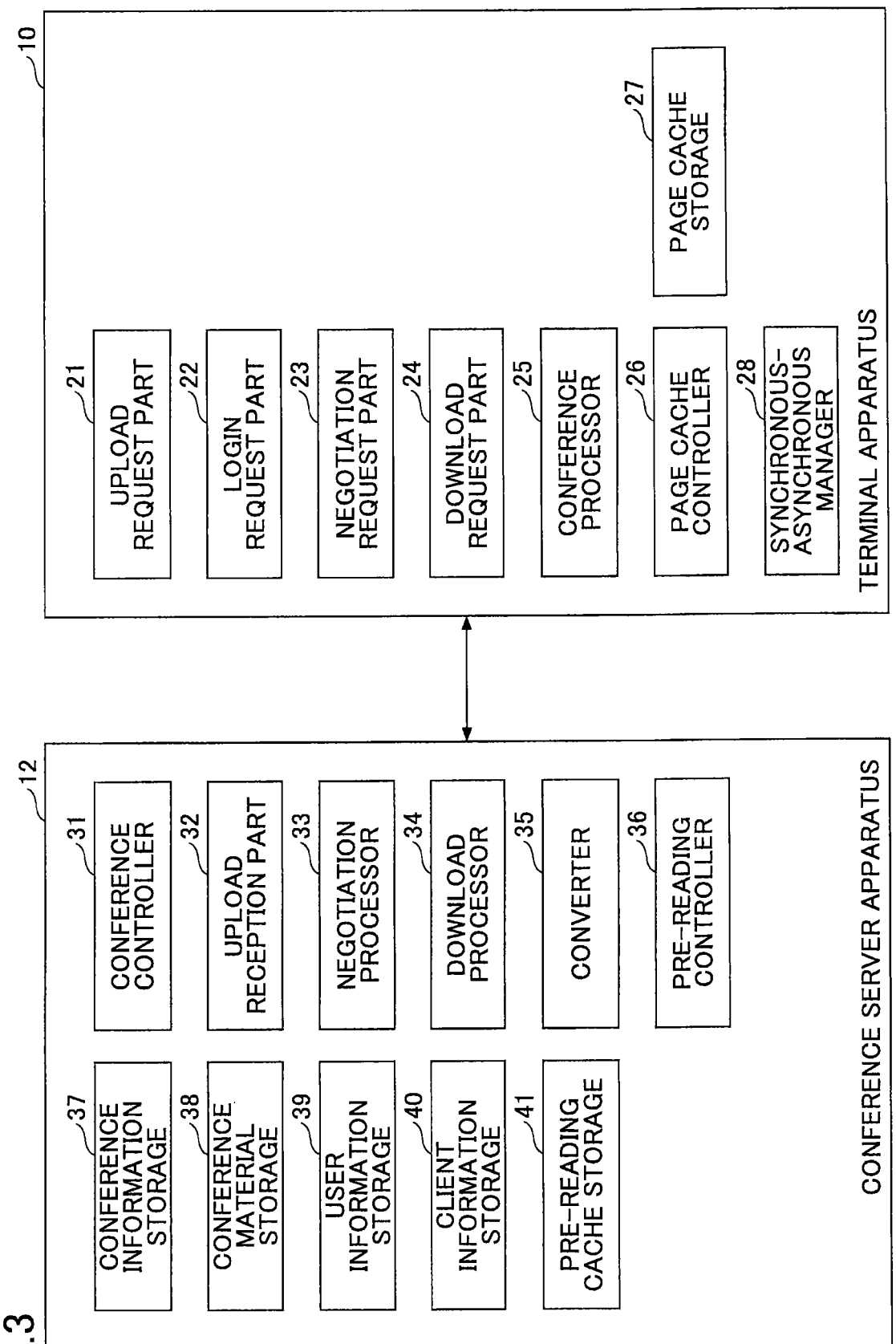
FIG. 3 is a functional block diagram illustrating an example of the conference system according to the embodiment.

The conference system 1 according to the embodiment may be implemented by functional blocks illustrated, for example, in FIG. 3. FIG. 3 is a functional block diagram illustrating an example of the conference system 1 according to the embodiment.

The terminal apparatus 10 may execute programs of a conference application and the like to implement an upload request part 21, a login request part 22, a negotiation request part 23, a download request part 24, a conference processor 25, a page cache controller 26, a page cache storage 27, and a synchronous-asynchronous manager 28.

The conference server apparatus 12 may execute programs to implement a conference controller 31, an upload reception part 32, a negotiation processor 33, a download processor 34, a converter 35, a pre-reading controller 36, a conference information storage 37, conference material storage 38, a user information storage 39, a client information storage 40, and a pre-reading cache storage 41.

Note that the conference information storage 37, the conference material storage 38, the user information storage 39, the client information storage 40, and the pre-reading cache storage 41 may be held by other server apparatuses or the like that are capable of transmitting data to or receiving data from the conference server apparatus 12.

The upload request part 21 is configured to request the conference server apparatus 12 to upload conference material by operations of an attendee of the conference. The login request part 22 is configured to request the conference server apparatus 12 to allow the terminal apparatus 10 to log in the conference server apparatus 12 by operations of the attendee of the conference.

The negotiation request part 23 is configured to negotiate between the terminal apparatus 10 and the conference server apparatus 12 for information associated with a download method (or download type) of the conference material. In this embodiment, the negotiation indicates communications for determining the download method (or download type) of the conference material. The download request part 24 is configured to request the conference server apparatus 12 to download the download data converted from the conference material based on the negotiated information (the later-described client information).

The conference processor 25 is configured to display the download data received from the conference server apparatus 12 on the display device 502, or the like. When the terminal apparatus 10 is in a synchronous mode, the conference processor 25 displays the conference material synchronously with other terminal apparatuses 10. For example, when the presenter, who is one of the attendees operating his or her terminal apparatus 10, pages the conference material (performs a page operation), this terminal apparatus 10 transmits the information about such an operation to the conference server apparatus 12.

The transmitted information about the operation may, for example, include page identification information for identifying pages subjected to synchronization. The information about the operation may further include, in addition to the page identification information, address information of the presenter's terminal apparatus 10, and material identification information for identifying the conference material including the pages subjected to synchronization. The material identification information may be any information insofar as the information is capable of identifying a corresponding one of materials. Examples of the material identification information include information about a name of the material, an identification number, and address information at which the material is saved.

Further, the terminal apparatuses 10 operated by attendees other than the presenter are configured to receive the information about the operations transmitted by the terminal apparatus 10 of the presenter to the conference server apparatus 12. For example, when the terminal apparatuses 10 of the attendees are in the synchronous mode, the terminal apparatuses 10 of the attendees may display the download data based on the information about the operations such as paging to implement synchronous display of the conference material between the terminal apparatuses 10 of the attendees.

Further, when the terminal apparatuses 10 of the attendees are in the asynchronous mode, the terminal apparatuses 10 of the attendees do not follow the information about the operations received from the conference server apparatus 12 but may display download data based on operations of the attendees to implement asynchronous display of the conference material between the terminal apparatuses 10 of the attendees. Hence, in the asynchronous mode, the terminal apparatus 10 may be able to temporarily display pages of the conference material other than the pages specified by the conference server apparatus 12.

The page cache controller 26 is configured to determine, after the conference has started, the download data to be saved in the page cache storage 27, and optionally causes the download request part 24 to download the download data, when necessary, from the conference server apparatus 12. The page cache storage 27 is configured to save the download data in association with identification information corresponding to pages. The synchronous-asynchronous manager 28 is configured to manage a synchronous mode and an asynchronous mode of the terminal apparatus 10.

The conference controller 31 is configured to transmit the information about the operations received from the terminal apparatus 10 of the presenter to each of the terminal apparatuses 10 of the attendees. Further, the conference controller 31 is configured to receive a login request from the terminal apparatus 10 to perform a login process. The login process is performed by utilizing the later-described conference information and user information.

The upload reception part 32 is configured to save the uploaded conference material in the conference material storage 38 when receiving an upload request for the conference material from the terminal apparatus 10. The negotiation processor 33 is configured to negotiate with the terminal apparatus 10. The negotiation processor 33 is also configured to save the information associated with the download method (or download type) of the negotiated conference material as client information in the client information storage 40.

The download processor 34 is configured to transmit download data requested by the terminal apparatus 10 to the terminal apparatus 10. The converter 35 is configured to convert the conference material into download data based on the client information. The pre-reading controller 36 is configured to determine download data to be saved in the pre-reading cache storage 41. The pre-reading controller 36 is configured to request the converter 35 to convert the conference material into the download data, and save the download data determined to be saved in the pre-reading cache storage 41.

The conference information storage 37 is configured to save conference information. The conference information includes the uploaded conference material, a conference status, and the like as information associated with a registered conference. The conference material storage 38 is configured to save data (files) of the conference material. Further, the user information storage 39 is configured to save accounts of the attendees to log in to the conference server apparatus 12.

The client information storage 40 is configured to save the information associated with the download method of the conference material negotiated by the negotiation processor 33 as client information. The client information storage 40 is further configured to save page information of the conference material currently displayed by each of the terminal apparatuses 10 in the synchronous mode. The pre-reading cache storage 41 is configured to save the download data determined by the pre-reading controller 36 to be saved.

Details of Process

In the following, details of a process of a conference system 1 according to an embodiment are described.

Figure 4:
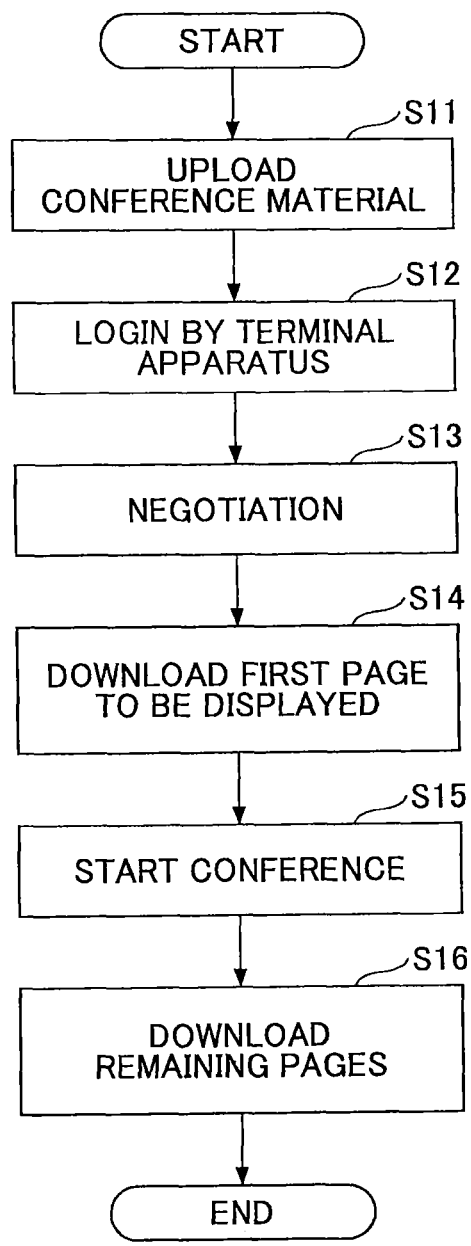
FIG. 4 is a flowchart illustrating an example of a process from uploading conference material to downloading the conference material.

FIG. 4 is a flowchart illustrating an example of a process from uploading conference material to downloading the conference material. In step S11, prior to holding a conference, presenters, organizers, and the like of the conference upload conference material. The upload request part 21 of the terminal apparatus 10 transmits an upload request for uploading the conference material to the upload reception part 32 of the conference server apparatus 12 by operations of the conference presenters, organizers, and the like. The upload reception part 32 receives the upload request for the conference material from the upload request part 21 of the terminal apparatus 10, and saves the uploaded conference material in the conference material storage 38.

In step S12, attendees of the conference log into the conference server apparatus 12 from their terminal apparatuses 10 using their accounts, passwords, and the like. The login request part 22 of the terminal apparatus 10 transmits a login request to the conference controller 31 of the conference server apparatus 12 with the accounts, passwords, and the like input from the attendees of the conference, for example. The conference controller 31 receives the login request from the login request part 22 of the terminal apparatus 10 to perform a login process.

When the login process is successful, the negotiation request part 23 of the terminal apparatus 10 negotiates with the negotiation processor 33 of the conference server apparatus 12 in step S13. Note that an example of information associated with the conference material download method (conference material download type) may include "per page, a jpeg format, 1024×768 pixels", or the like.

When the negotiation ends, the terminal apparatus 10 receives download data of the first page to be displayed from the conference server apparatus 12 in step S14. Note that the download data received by the terminal apparatus 10 from the conference server apparatus 12 are converted from the conference material based on the information associated with the conference material download method (conference material download type). For example, the download data of the first page to be displayed may be data of a first page of a first conference material to be displayed. The download request part 24 of the terminal apparatus 10 receives download data of the first page to be displayed from the download processor 34 of the conference server apparatus 12.

When the download data of the first page to be displayed is downloaded (completely transmitted) into all the terminal apparatuses 10 operated by the attendees, step S15 is processed to initiate the conference in the conference system 1.

Accordingly, the conference system 1 of the present embodiment may be able to start the conference at the time at which data of the first page to be displayed have been downloaded. Hence, the conference system 1 of the present embodiment may be able to significantly quicken the start of the conference by initiating the conference at the time at which data of the first page to be displayed have been downloaded. For example, when the conference material has 100 pages, the conference system 1 of the present embodiment may be able to roughly reduce a standby time until the conference has started to approximately one millionth of the standby time of a case in which all the pages of the conference material have collectively been downloaded before the conference has started.

Then, necessary pages of the remaining pages (the remaining part of the conference material) other than the first page to display is downloaded from the conference server apparatus 12 to the terminal apparatuses 10 in a background process in step S16 after the conference has started. Note that unnecessary pages may be appropriately deleted based on areas of the page cache storage 27 as described later.

Further, after the conference has started, the synchronous-asynchronous manager 28 of the terminal apparatus 10 switches between the synchronous mode and the asynchronous mode by the attendee's operations. When the terminal apparatus 10 is in a synchronous mode, the conference processor 25 displays the conference material synchronously with other terminal apparatuses 10. On the other hand, when the terminal apparatus 10 is in an asynchronous mode, the conference processor 25 of the terminal apparatus 10 displays the conference material asynchronously with other terminal apparatuses 10. Hence, the terminal apparatus 10 in the asynchronous mode may be able to temporarily display pages of the conference material other than the pages specified by the conference server apparatus 12.

Negotiation

Figure 5:
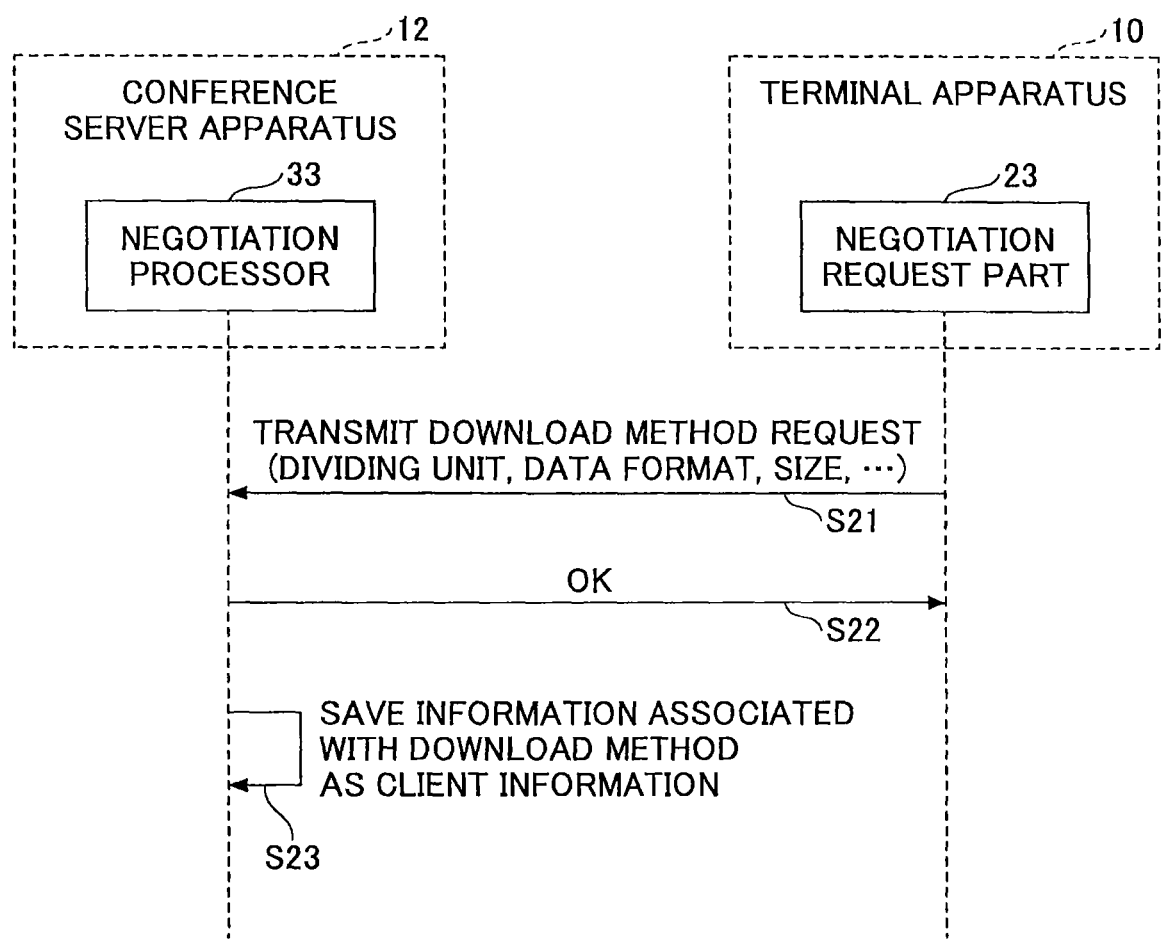
FIG. 5 is a sequence diagram illustrating an example of a negotiation process.
Figure 14:
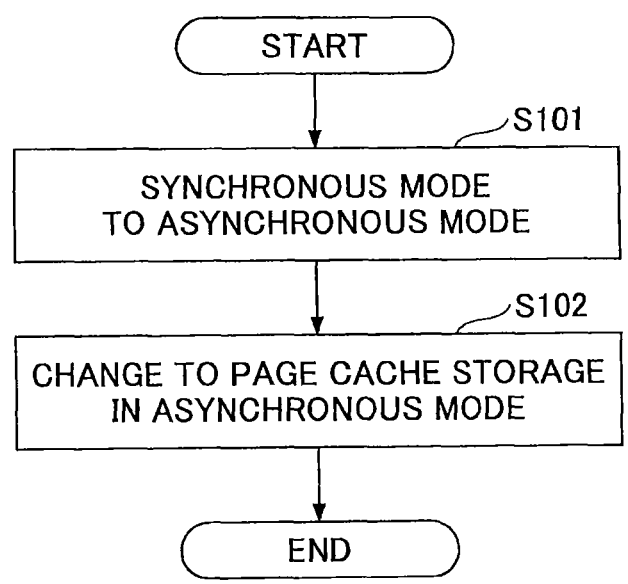
FIG. 14 is a flowchart illustrating an example of a process performed by a page cache controller when the synchronous mode is switched to the asynchronous mode.

The negotiation illustrated in step S13 of FIG. 14 may be performed as illustrated in a sequence diagram of FIG. 5, for example. FIG. 5 is a sequence diagram illustrating an example of the negotiation process.

In step S21, the negotiation request part 23 of the terminal apparatus 10 transmits a download method request (or a download type request) to the negotiation processor 33 of the conference server apparatus 12 in order to negotiate information associated with the download method. The download method request specified from the terminal apparatus 10 may, for example, include a dividing unit, a data format, and a display size (size) of the conference material. Note that default values may be used for items that are not included in the download method request specified by the terminal apparatus 10.

When the negotiation processor 33 of the conference server apparatus 12 is capable of handling the download method request specified by the terminal 10, the negotiation processor 33 proceeds with step S22 to respond with "OK" or the like to the terminal apparatus 10 so as to report that the negotiation processor 33 is capable of handling the specified download method request. Note that the process of step S22 may be omitted.

In step S23, the negotiation processor 33 of the conference server apparatus 12 saves the information associated with the negotiated download method as client information in the client information storage 40 as illustrated in FIG. 6.

FIG. 6 is a configuration diagram illustrating an example of client information. As illustrated in FIG. 6, the client information includes items of a client ID, a dividing unit, a data format, a size, cache information, and the like. The client ID is identification information for identifying the terminal apparatus 10.

The client ID may be a session ID allocated along with establishment of a communications session between the terminal apparatus 10 and the conference server apparatus 12. The dividing unit is a unit to divide the conference information, and an example of the dividing unit may be "one page unit". The data format is a format of the download data, and an example of the data format may be a "JPEG format".

Further, the size indicates pixels of the download data, such as "1024×768". The cache information includes information such as the number of cacheable pages or algorithm to determine the cacheable pages.

As illustrated above, in the negotiation illustrated in step S13 of FIG. 4, various combinations of items such as the dividing unit, the data format, the size, and the like of the conference material may be specified from the terminal apparatus 10 to the conference server apparatus 12.

Note that in the negotiation illustrated in step S13, the conference server apparatus 12 may determine the dividing unit, the data format, the size, and the like based on the cache information of the terminal apparatus 10. In this case, the conference server apparatus 12 may receive the cache information from the terminal apparatus 10, and then determine the dividing unit, the data format, the size, and the like based on the received cache information.

Note that the cache information may vary with hardware capabilities of the terminal apparatuses 10. The cacheable number of pages included in the cache information may be determined based on the size of the storage area provided with the hardware. Hence, the download method of the conference material determined by the negotiation may be processed based on the capability difference of the terminal apparatus 10.

Download of First Page to be Displayed

Figure 7:
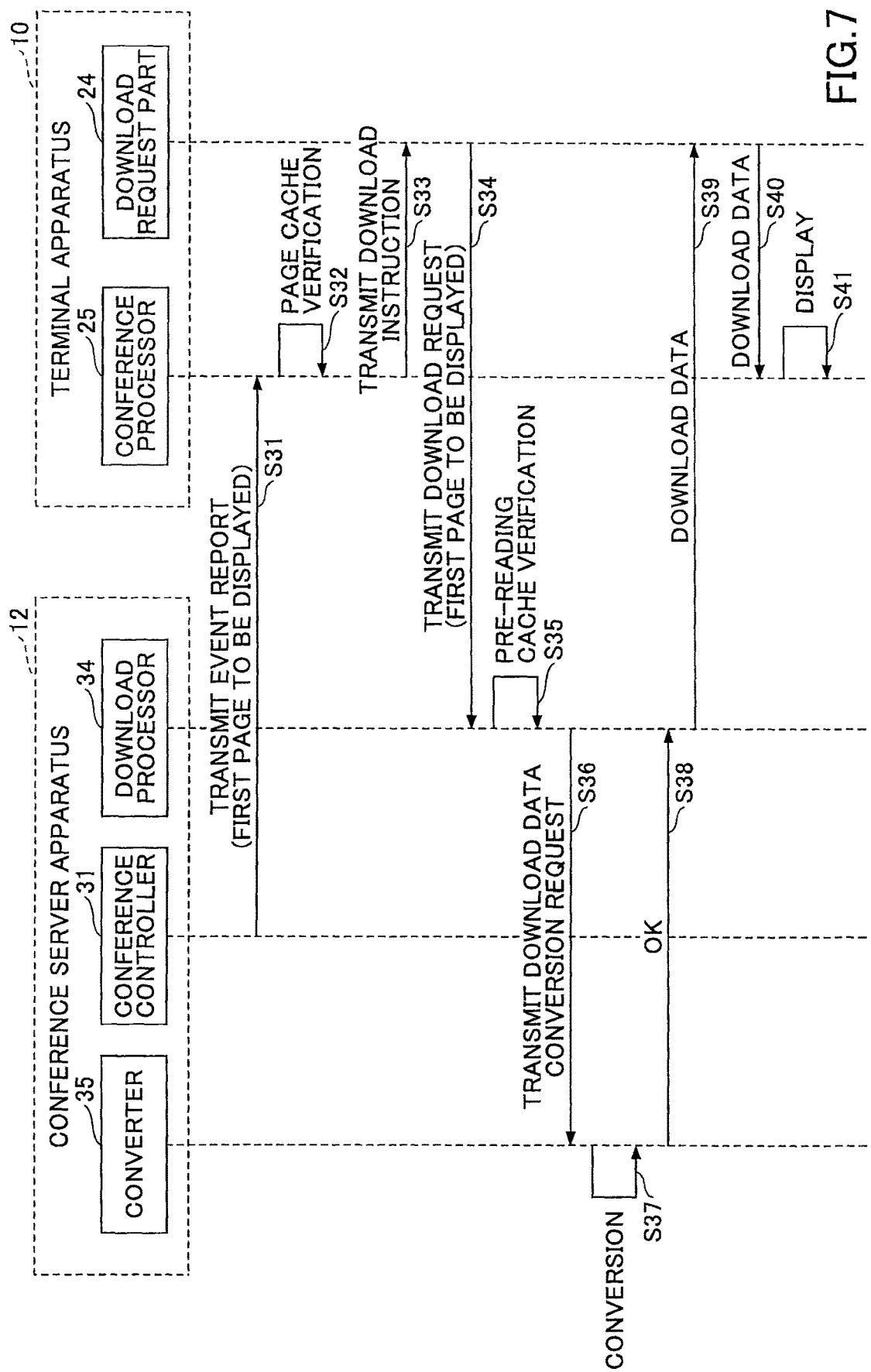
FIG. 7 is a sequence diagram illustrating an example of a process of downloading a first page to be displayed.

The "download first page to be displayed" illustrated in step S14 of FIG. 4 may be performed as illustrated in a sequence diagram of FIG. 7, for example. FIG. 7 is a sequence diagram illustrating an example of a process of downloading the first page to be displayed.

In step S31, the conference controller 31 of the conference server apparatus 12 transmits an event report specifying the first page to be displayed of the conference material to the terminal apparatus 10 that has completed the negotiation in step S13. The specification of the page may be implemented by including page identification information to identify that page.

In step S32, the conference processor 25 of the terminal apparatus 10 verifies whether the download data corresponding to the page identification information of the conference material specified in step S31 are saved in the page cache storage 27. In the following, an illustration is given of a case where the download data corresponding to the specified page identification information of the conference material are not saved.

In step S33, the conference processor 25 transmits an instruction to download the download data corresponding to the specified page identification information of the conference material to the download request part 24. In step S34, the download request part 24 transmits a download request for downloading the download data corresponding to the specified page identification information of the conference material to the download processor 34 of the conference server apparatus 12.

In step S35, the download processor 34 of the conference server apparatus 12 verifies whether the download data corresponding to the specified page identification information of the conference material are saved in the pre-reading cache storage 41. In the following, an illustration is given of a case where the download data corresponding to the specified page identification information of the conference material are not saved.

In step S36, the download processor 34 transmits a conversion request to convert the specified page identification information of the conference material into download data corresponding to the specified page identification information of the conference material to the converter 35. In step S37, the converter 35 converts the specified page identification information (the first page to be displayed) of the conference material into download data corresponding to the specified page identification information of the conference material based on the client information corresponding to the terminal apparatus 10 serving as a request source.

When the conversion process ends, the converter 35 transmits to the download processor 34 a response with "OK" or the like in step S38 to indicate that the conversion into the download data corresponding to the specified page identification information of the conference material has ended. In step S39, the download processor 34 transmits to the download request part 24 of the terminal apparatus 10 the download data corresponding to the page identification information of the conference material requested by the download request part 24.

In step S40, the download request part 24 transmits the download data corresponding to the specified page identification information of the conference material to the conference processor 25. In step S41, the conference processor 25 displays the download data corresponding to the specified page identification information of the conference material to the display device 502 so as to display the conference material synchronously with other terminal apparatuses 10. When the conference starts, each of the terminal apparatuses 10 is in a synchronous mode.

Figure 8:
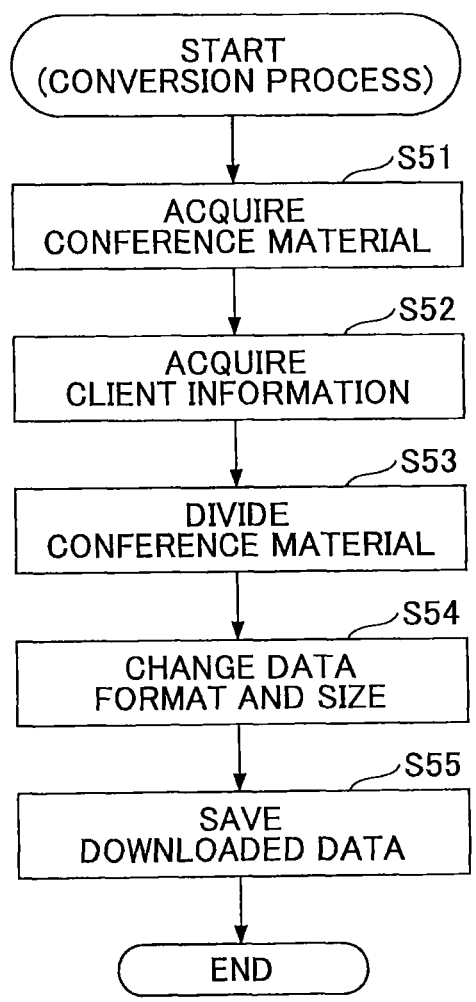
FIG. 8 is a flowchart illustrating an example of a conversion process of converting conference material into download data.

Note that the conversion process in step S37 of FIG. 7 may be conducted as illustrate in FIG. 8. FIG. 8 is a flowchart illustrating an example of the conversion process of converting the conference material into the download data.

In step S51, the converter 35 acquires the conference material including the specified pages from the conference material storage 38. In step S52, the converter 35 acquires the client information corresponding to the terminal apparatus 10 serving as the request source that has transmitted the download request in step S34 of FIG. 7.

In step S53, the converter divides the conference material to include specified pages of the conference material based on the dividing unit of the client information and the specified pages of the conference material. In step S54, the converter 35 converts a data format and a size of each of the divided units of the conference material into a data format and a size of the client information.

In step S55, the converter 35 saves each of the download data converted from the conference material in association with a corresponding one of the page identification information in the cache storage 41. When the dividing unit of the conference material is two or more pages, each of the download data may be associated with two or more items of page identification information. Note that the converted download information may be saved in the conference material storage 38. Further, in the conference system 1 according to the embodiment, typical dividing unit, data format and size of the conference material may be converted into the download data, and the converted data may be saved in advance so as to reduce the time for converting the download data.

Download of Remaining Pages

Figure 9:
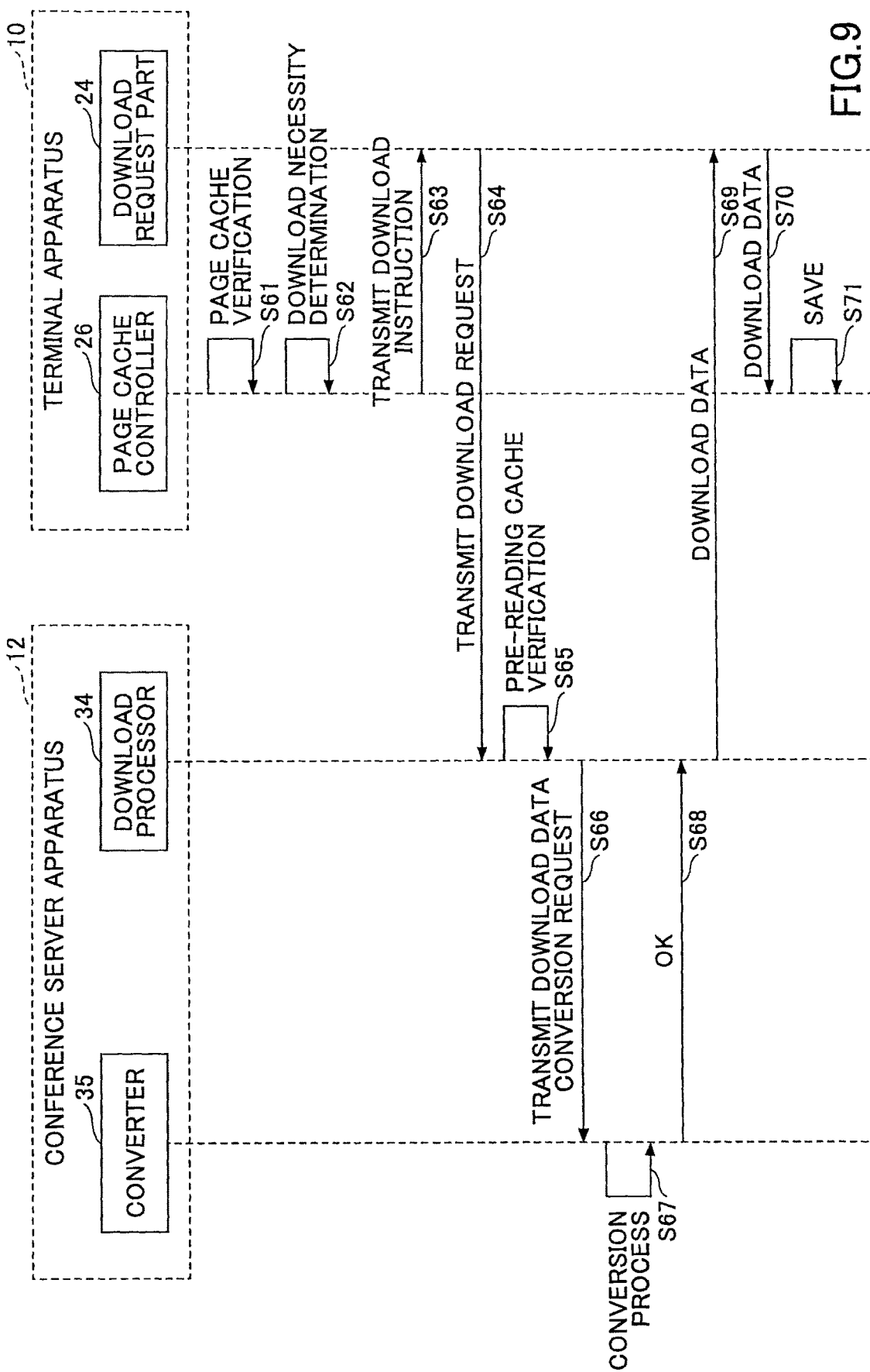
FIG. 9 is a sequence diagram illustrating an example of a process of downloading remaining pages.

The "download remaining pages" illustrated in step S16 of FIG. 4 may be performed as illustrated in a sequence diagram of FIG. 9, for example. FIG. 9 is a sequence diagram illustrating an example of a process of downloading the remaining pages. Each of the terminal apparatuses 10 performs the process of FIG. 9 at any desired timing to receive download data of necessary pages from the conference server apparatus 12 after the conference has started.

In step S61, the page cache controller 26 verifies the download data saved in the page cache storage 27, and a free space of the page cache storage 27. Further, in step S62, the page cache controller 26 determines whether the download is necessary as described later. In the following, an illustration is given of a case where the page cache controller 26 has determined that the download is necessary.

When the page cache controller 26 has determined that the download is necessary, the page cache controller 26 transmits an instruction to the download request part 24 to download the download data of the pages of the conference material being determined as necessary in step S63. In step S64, the download request part 24 transmits the download request for downloading the download data corresponding to the pages being determined as necessary of the conference material to the download processor 34 of the conference server apparatus 12. The download request includes page identification information of the conference material being determined as necessary.

In step S65, the download processor 34 of the conference server apparatus 12 verifies whether the download data requested by the terminal apparatus 10 are saved in the pre-reading cache storage 41, based on the received page identification information. In the following, an illustration is given of a case where the download data requested are not saved. In step S66, the download processor 34 transmits a conversion request to convert the requested pages of the conference material into the download data to the converter 35.

In step S67, the converter 35 converts the requested pages of the conference material into the download data based on the client information corresponding to the terminal apparatus 10 serving as a request source. When the conversion process ends, the converter 35 may, for example, transmit to the download processor 34 a response with "OK" or the like in step S68 to indicate that the conversion into the download data corresponding to the requested pages of the conference material has ended.

In step S69, the download processor 34 transmits to the download request part 24 of the terminal apparatus 10 the download data corresponding to the page identification information of the conference material requested by the download request part 24.

In step S70, the download request part 24 transmits the download data corresponding to the requested page identification information of the conference material to the page cache controller 26. In step S71, the page cache controller 26 saves the download data of the pages of the conference material being determined as necessary in association with the page identification information in the page cache storage 27 in the later-described synchronous or asynchronous mode.

Figure 10:
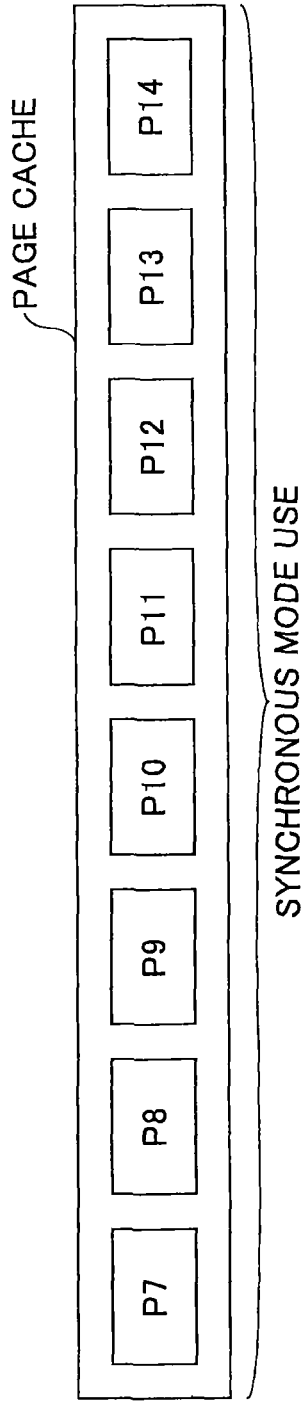
FIG. 10 is a configuration diagram illustrating an example of a page cache storage in a synchronous mode.
Figure 11:
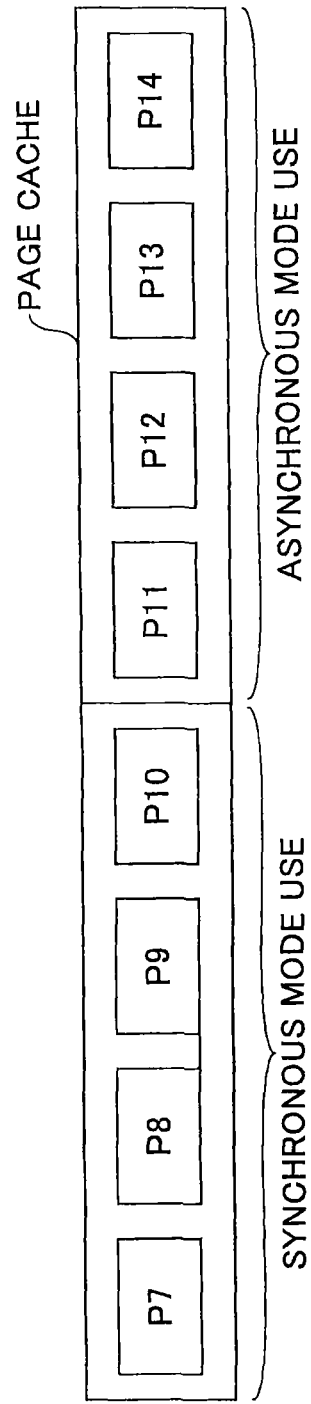
FIG. 11 is a configuration diagram illustrating an example of a page cache storage in an asynchronous mode.

FIG. 10 is a configuration diagram illustrating an example of the page cache storage in a synchronous mode. FIG. 11 is a configuration diagram illustrating an example of the page cache storage in an asynchronous mode. As illustrated in FIGS. 10 and 11, the page cache controller 26 in the synchronous or asynchronous mode uses the page cache storage 27 by switching between different control types.

For example, the cache controller 26 in the synchronous mode uses all the areas (cache areas) of the page cache storage 27 as a cache area for a synchronous mode use as illustrated in FIG. 10.

Similarly, the page cache controller 26 in the asynchronous mode temporarily allocates some of the cache areas of the page cache storage 27 as a cache area for an asynchronous mode as illustrated in FIG. 11.

Note that the cache areas in the synchronous mode and asynchronous mode illustrated in FIGS. 10 and 11 may only be examples. Any cache areas may be used insofar as the cache areas are provided separately and controllable in the synchronous mode and in the asynchronous mode.

Figure 12:
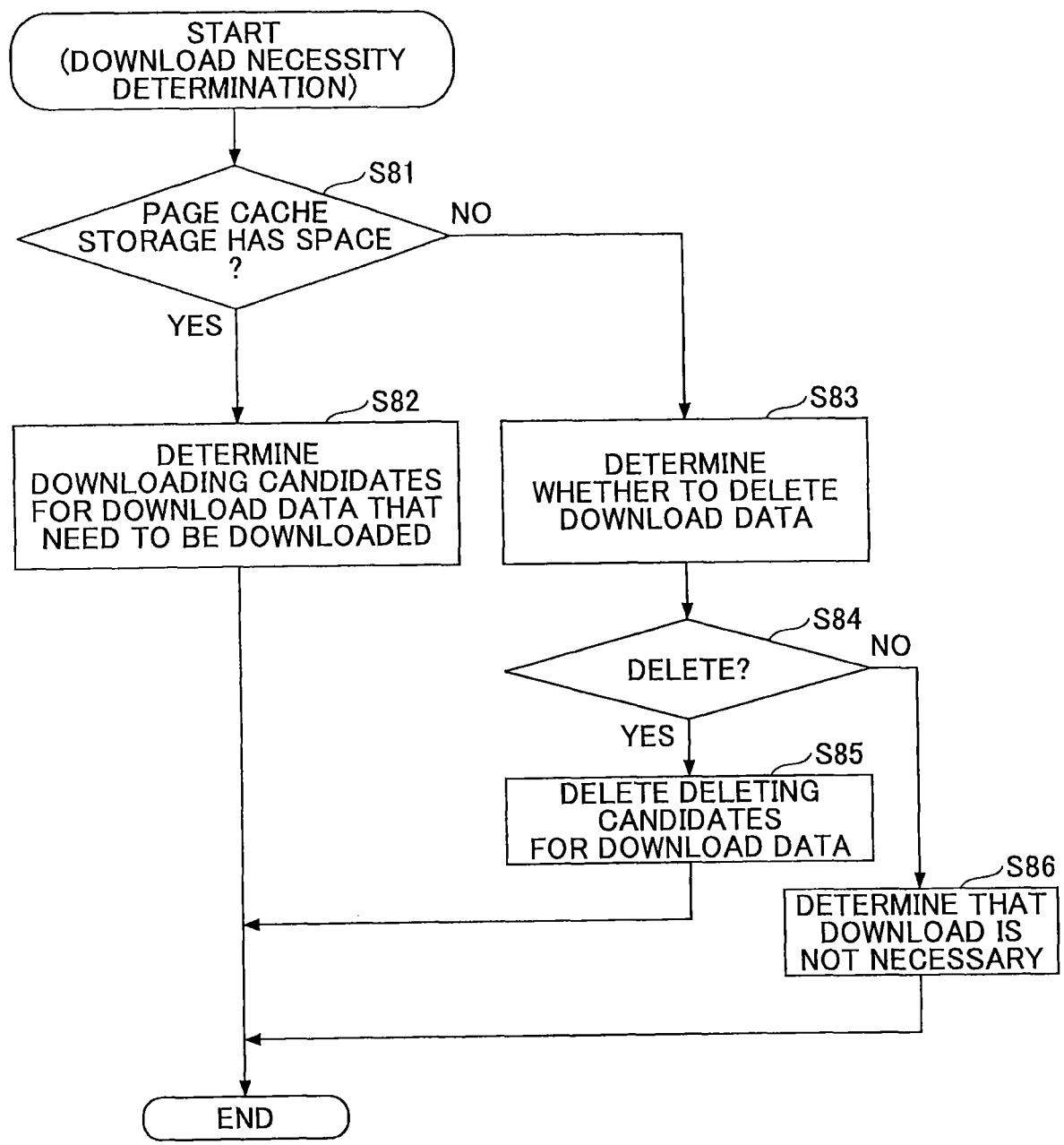
FIG. 12 is a flowchart illustrating an example of a download necessity determination process of determining whether the download is necessary.

The determination in step S62 to determine whether download is necessary may be conducted as illustrated in FIG. 12, for example. FIG. 12 is a flowchart illustrating an example of a download necessity determination process of determining whether the download is necessary.

Note that in the synchronous mode, the download necessity determination process of FIG. 12 is performed with respect to the cache area for the synchronous use illustrated in FIG. 10. Further, in the asynchronous mode, the download necessity determination process of FIG. 12 is performed with respect to the cache area for the synchronous use and the cache area for the asynchronous use illustrated in FIG. 11, respectively.

First, an illustration is given of the download necessity determination process in the synchronous mode.

In step S81, the page cache controller 26 determines whether the page cache storage 27 having the cache area for the synchronous use illustrated in FIG. 10 has any free space. For example, the page cache storage 27 of FIG. 10 indicates that the number of cacheable pages is "8", and that there is no free space in the page cache storage 27.

For example, when the terminal apparatus 10 displays the $10^{th}$ page, the page cache storage 27 of FIG. 10 saves download data of 7 to 9 pages and 11 to 14 pages neighboring the $10^{th}$ page, in addition to download data of the $10^{th}$ page, in association with page identification information.

When the page cache storage 27 of FIG. 10 has a free space, the page cache controller 26 proceeds with step S82. The page cache controller 26 determines the (important) pages having high likelihood of receiving a download request, such as neighboring pages of the displayed page, as download data candidates for download data necessary to be downloaded. Note that in the process of step S82, the page cache controller 26 determines download data candidates so as not to allow the duplicated download data to be saved in the page cache storage 27.

For example, the page cache controller 26 may determine the download data of the pages having the next highest likelihood of being required for a paging operation, such as the pages neighboring the page currently displayed on the display device 50, as the download data candidates.

On the other hand, in step S81, when the page cache controller 26 determines that there is no free space in the page cache storage 27, the page cache controller 26 performs a process in step S83. In step S83, the page cache controller 26 determines whether to delete the download data of the pages of the conference material saved in the page cache storage 27.

For example, the page cache controller 26 may determine the download data of the pages having the next lowest likelihood of being required for a paging operation, such as the pages located farthest from the page currently displayed on the display device 50, as deleting download data candidates. The page cache controller 26 determines download data having the next lowest likelihood of being required as deleting download data candidates among the download data saved in the page cache storage 27.

Further, the page cache controller 26 determines download data having the next highest likelihood of being required as downloading candidates of the download data (the downloading download data candidates) among the download data not saved in the page cache storage 27.

When the downloading download data candidates have the next likelihood of being required higher than that of the deleting download data candidates, the page cache controller 26 determines to delete the deleting download data candidates.

When the page cache controller 26 determines to delete the deleting download data candidates, the page cache controller 26 proceeds with steps S84 and S85 to delete the deleting download data candidates from the page cache storage 27.

When the page cache controller 26 determines not to delete the deleting download data candidates, the page cache controller 26 proceeds with steps S84 and S86 to determine that download of the downloading download data candidates is not necessary.

In the download process of the remaining pages illustrated in FIG. 9, the download data having the next highest likelihood of being required may be downloaded in advance from the conference server apparatus 12 into the cache area for the synchronous mode use as illustrated in FIG. 10 in the synchronous mode.

Further, when there is no free space in the page cache storage 27, a free space may be acquired by deleting the download data having the low likelihood of being subsequently required, and the download data having the high likelihood of being subsequently required may be downloaded in advance into the terminal apparatus 10. When the download of the download data having the high likelihood of being subsequently required ends, the download process of the remaining pages is interrupted (an idle status), and restarts after the operation such as paging has been conducted.

Subsequently, an illustration is given of the download necessity determination process in the asynchronous mode. Note that the download necessity determination process in the asynchronous mode is performed with respect to the cache area for the synchronous use and the cache area for the asynchronous use illustrated in FIG. 11, respectively.

In step S81, the page cache controller 26 determines whether the cache storage 27 having the cache area for the synchronous use or the cache area for the asynchronous use illustrated in FIG. 11 has any free space.

For example, the page cache storage 27 illustrated in FIG. 11 includes the cache area for the synchronous mode use having the cacheable number of "4" pages, and the cache area for the asynchronous mode use having the cacheable number of "4" pages. Further, the page cache storage 27 illustrated in FIG. 11 includes no free space in the cache area for the synchronous mode use nor in the cache area for the asynchronous mode use. The page cache storage 27 illustrated in FIG. 11 represents an example of download data saved in the cache area for the synchronous mode use and the cache area for the asynchronous mode use immediately after the asynchronous mode is switched from the synchronous mode.

When there is a free space in the cache area for the synchronous mode use or the cache area for the asynchronous mode use illustrated in FIG. 11, the page cache controller 26 proceeds with step S82. For example, when there is a free space in the cache area for the asynchronous mode use, the page cache controller 26 determines the pages having a high likelihood of receiving a download request as download data candidates necessary for downloading such as the pages neighboring the currently displayed page.

Further, when there is a free space in the cache area for the synchronous mode use, the page cache controller 26 determines the pages having the high likelihood of receiving the download request after being switched into the synchronous mode, such as pages neighboring the displayed page in the synchronous mode, as the download data candidates.

Note that in the process of step S82, the page cache controller 26 may be configured to determine download data candidates so as not to allow the duplicated download data for the synchronous mode use nor for the asynchronous mode use to be saved in the page cache storage 27.

On the other hand, when the page cache controller 26 determines that there is no cache area for the synchronous mode use or for the asynchronous mode use, the page cache controller 26 proceeds with a process in step S83.

In step S83, the page cache controller 26 determines whether to delete the download data of the pages of the conference material saved in the cache area for the synchronous mode use or for the asynchronous mode use.

For example, when there is no cache area for the asynchronous mode use, the page cache controller 26 determines the pages of the download data having the next lowest likelihood of being required, such as the pages located farthest from the currently displayed page, as deleting download data candidates.

Further, when there is no cache area for the synchronous mode use, the page cache controller 26 determines the pages of the download data having the next lowest likelihood of receiving the download request when switching back to the synchronous mode, such as the pages located farthest from the currently displayed page in the synchronous mode, as deleting download data candidates.

Further, the page cache controller 26 determines download data having the next highest likelihood of being required as downloading candidates of the download data (the download data candidates) among the download data not saved in the cache area for the synchronous mode use or the cache area for the asynchronous mode use.

When the downloading download data candidates have a likelihood of being required subsequently higher than that of the deleting download data candidates, the page cache controller 26 determines to delete the deleting download data candidates. When the page cache controller 26 determines to delete the deleting download data candidates, the page cache controller 26 moves from step S84 to step S85 to delete the deleting download data candidates from the cache area for the synchronous mode use or the cache area for the asynchronous mode use.

When the page cache controller 26 determines not to delete the deleting download data candidates, the page cache controller 26 moves from step S84 to step S86 to determine that download of the downloading download data candidates is not necessary.

In the download process of the remaining pages illustrated in FIG. 9, the download data having the next highest likelihood of being required may be downloaded in advance from the conference server apparatus 12 into the cache area for the asynchronous mode use as illustrated in FIG. 11 in the asynchronous mode.

Further, the download data having the next highest likelihood of being required when the current mode is switched back to synchronous mode may be downloaded in advance from the conference server apparatus 12 into the cache area for the synchronous mode use as illustrated in FIG. 11 in the asynchronous mode.

Further, when there is no free space in the cache area for the synchronous mode use or the asynchronous mode use, a free space may be acquired by deleting the download data having the low likelihood of being subsequently required, and the download data having the high likelihood of being subsequently required may be downloaded in the terminal apparatus 10. When the download of the download data having the high likelihood of being subsequently required ends, the download process of the remaining pages is interrupted (an idle status), and restarts after the operation such as paging has been conducted.

Process when the Page to be Displayed in the Synchronous Mode are Changed

After the conference starts, each of the attendees of the conference appropriately switches between the synchronous mode or the asynchronous mode of his or her operating terminal apparatus 10 to display the conference material synchronously with other terminal apparatuses 10, or to asynchronously display the pages of the conference material other than those pages temporarily specified by the server apparatus 12. When the page to be displayed is changed, each of the terminal apparatuses 10 conducts different processes between the synchronous mode and the asynchronous mode as illustrated below.

Figure 13:
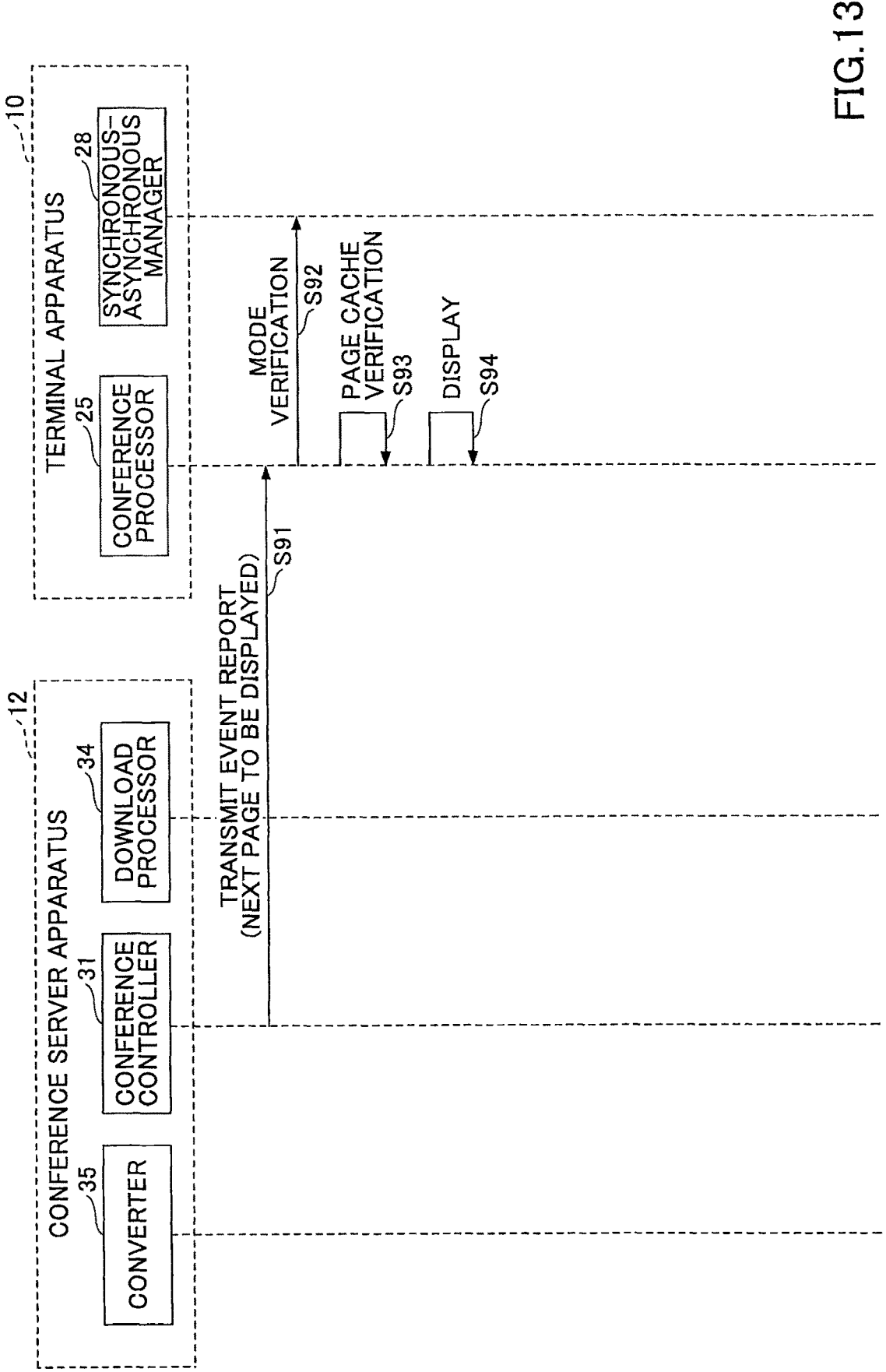
FIG. 13 is a sequence diagram illustrating an example of a process in which a page to be displayed in the synchronous mode is changed.

For example, when the operation such as paging is conducted in the synchronous mode to change the page to be displayed, the conference system 1 of the embodiment changes the page of the conference material displayed on the display device 50 of the corresponding terminal apparatus 10 as illustrated in FIG. 13. FIG. 13 is a sequence diagram illustrating an example of the process in which the page to be displayed in the synchronous mode is changed.

It is assumed that the conference server apparatus 12 has received information about the paging operation from the terminal apparatus 10 of the presenter. In step S91, the conference controller 31 of the conference server apparatus 12 transmits conference material display event report specifying the next page to be displayed based on the information about the paging operation received from the terminal apparatus 10 of the presenter.

In step S92, the conference processor 25 of the terminal apparatus 10 transmits an inquiry about the current mode to the synchronous-asynchronous manager 28 to verify whether the current mode is the synchronous mode or the asynchronous mode. The conference processor 25 verifies that the current mode is the synchronous mode.

In step S93, the conference processor 25 of the terminal apparatus 10 verifies whether the download data corresponding to the page of the conference material specified in step S91 are saved in the page cache storage 27. In the following, an illustration is given of a case where the download data corresponding to the specified page of the conference material are saved.

In step S94, the conference processor 25 acquires the download data corresponding to the specified page of the conference material from the page cache storage 27, and displays the acquired download data to the display device 502 so as to display the conference material synchronously with other terminal apparatuses 10. Note that when the download data corresponding to the specified page of the conference material are not saved in the page cache storage 27, the conference processor 25 performs processes subsequent to step S33 of FIG. 7 to acquire the download data corresponding to the specified page of the conference material.

In the conference system 1 of the embodiment, each of the terminal apparatuses 10 performs the process of FIG. 9 at any desired timing to receive download data of the remaining pages from the conference server apparatus 12. In this case, the conference system 1 of the embodiment may be able to control the timing of downloading such as shifting the timing of downloading the data between the terminal apparatuses 10 while monitoring band information so as not to cause congestion in the network 14.

The conference system 1 of the embodiment may exhibit a secondary effect to suppress the degradation of performance due to pressure on a network band by shifting the download timing between the terminal apparatuses 10. Further, the conference system 1 of the embodiment may only store some of the pages of the conference material by causing the page cache controller 26 to control the page cache storage 27 to store the download data.

Each of the terminal apparatuses 10 may cache the download data as described above such that high performance may be expected with fewer resources (e.g., memory or a local disk).

Cache Areas when Switching from the Synchronous Mode to the Asynchronous Mode

The terminal apparatuses 10 perform a process illustrated in FIG. 14 when the terminal apparatuses 10 are switched from the synchronous mode to the asynchronous mode after the conference has started. FIG. 14 is a flowchart illustrating an example of a process performed by the page cache controller when the synchronous mode is switched to the asynchronous mode.

In step S101, the page cache controller 26 of the terminal apparatus 10 receives a mode switching request from the conference processor 25 based on the attendee's switching operation from the synchronous mode to the asynchronous mode. In step S102, the page cache controller 26 changes the cache area in the synchronous mode illustrated in FIG. 10 to the cache area in the asynchronous mode illustrated in FIG. 11.

For example, the page cache controller 26 may be able to separately provide the cache area for the synchronous mode use and the cache area for the asynchronous mode use in the asynchronous mode by temporarily allocating a part of the cache area for the synchronous mode use of FIG. 10 as the cache area for the asynchronous mode use of FIG. 11.

Process when the Page to be Displayed in the Asynchronous Mode is Changed

Figure 15:
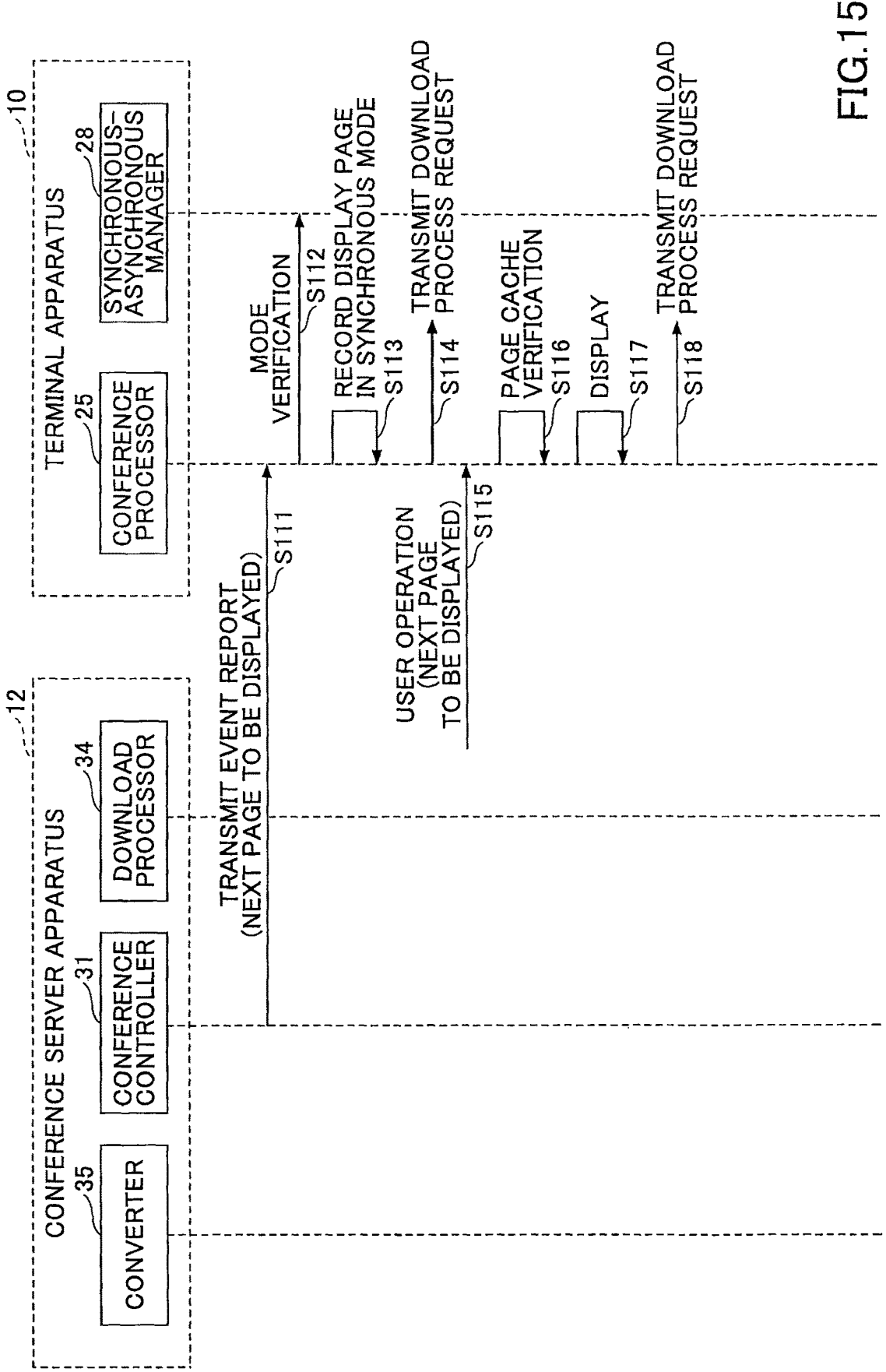
FIG. 15 is a sequence diagram illustrating an example of a process in which a page to be displayed in the asynchronous mode is changed.

Further, when the operation such as paging is conducted in the asynchronous mode to change the page to be displayed, the conference system 1 of the embodiment changes the page of the conference material displayed on the display device 50 of the corresponding terminal apparatus 10 as illustrated in FIG. 15. FIG. 15 is a sequence diagram illustrating an example of the process in which the page to be displayed in the asynchronous mode is changed.

It is assumed that the conference server apparatus 12 has received information about the paging operation from the terminal apparatus 10 of the presenter. In step S111, the conference controller 31 of the conference server apparatus 12 transmits conference material display event report that specifies the next page to be displayed based on the information about the paging operation received from the terminal apparatus 10 of the presenter. The specification of the page may be implemented by including page identification information to identify that page.

In step S112, the conference processor 25 of the terminal apparatus 10 transmits an inquiry about the current mode to the synchronous-asynchronous manager 28 to verify whether the current mode is the synchronous mode or the asynchronous mode. The conference processor 25 verifies that the current mode is the asynchronous mode.

In step S113, since the current mode is the asynchronous mode, the conference processor 25 does not display the page of the conference material specified by the conference server apparatus 12. However, the conference processor 25 stores page identification information of the page displayed in the synchronous mode every time the conference processor 25 receives the page identification information of the displayed page from the conference server apparatus 12 in order to immediately display the specified one of the pages of the conference material when the asynchronous mode is switched into the synchronous mode.

In step S114, the conference processor 25 transmits a download process request for performing a download process illustrated in FIG. 9 to the page cache controller 26. Hence, the terminal apparatus 10 may be able to download the download data having the next highest likelihood of being required in advance from the conference server apparatus 12 into the cache area for the synchronous mode use as illustrated in FIG. 11 when the current mode is switched back to synchronous mode.

It is assumed that in step S115, the conference processor 25 of the terminal apparatus 10 receives from the attendee a user's operation to specify the page to be displayed subsequently to the paging operation in the asynchronous mode.

In step S116, the conference processor 25 of the terminal apparatus 10 verifies whether the download data corresponding to the page identification information of the conference material specified by the user's operation are saved in the page cache storage 27. In the following, an illustration is given of a case where the download data corresponding to the specified page identification information of the conference material are saved in the cache area for the asynchronous mode use.

In step S117, the conference processor 25 acquires the download data corresponding to the specified page identification information of the conference material from the cache area for the asynchronous mode use to display the acquired download data on the display device 502, thereby displaying the conference material asynchronously. Note that when the download data corresponding to the specified page identification information of the conference material are not saved in the page cache storage 27, the conference processor 25 performs processes subsequently to step S33 of FIG. 7. The conference processor 25 acquires the download data corresponding to the specified page identification information of the conference material.

In step S118, the conference processor 25 transmits a download process request for performing a download process illustrated in FIG. 9 to the page cache controller 26. Hence, the terminal apparatus 10 may be able to download the download data having the next highest likelihood of being required in advance from the conference server apparatus 12 into the cache area for the asynchronous mode use as illustrated in FIG. 11.

As described above, the page cache controller 26 performs the process illustrated in FIG. 9 in the asynchronous mode at any desired timing in the asynchronous mode in a manner similar to a case when the terminal apparatus 10 is in the synchronous mode. Hence, even when the terminal apparatus 10 is in the asynchronous mode, the terminal apparatus 10 may be able to receive the download data having the next highest likelihood of being required or the download data having the likelihood of being required when the current mode is switched back to the synchronous mode, and save the received download data in the page cache storage 27.

Process when Switching Between Synchronous Mode and Asynchronous Mode

When the terminal apparatus 10 is switched from the synchronous mode to the asynchronous mode, the terminal apparatus 10 does not change the page to be displayed on the display device 502 or the download data of the page cache storage 27 until the terminal apparatus 10 receives the user's operation such as a paging operation from the attendee. After the terminal apparatus 10 is switched into the asynchronous mode, the terminal apparatus 10 appropriately changes the page of the conference material to be displayed or the download data of the page cache storage 27 by following the user's operation performed by the attendee. The page cache controller 26 changes a control system of the cache area for the synchronous mode use illustrated in FIG. 10 to a control system of the cache area for the asynchronous mode use illustrated in FIG. 11.

Figure 16:
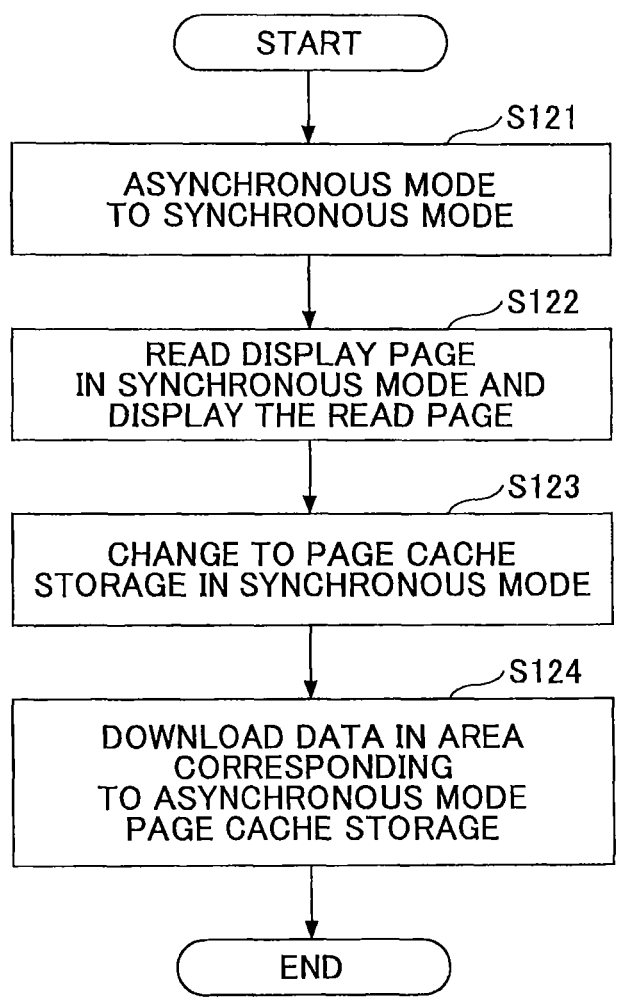
FIG. 16 is a flowchart illustrating an example of a process performed by a terminal apparatus when the synchronous mode is switched to, from the asynchronous mode.

On the other hand, the terminal apparatus 10 performs a process illustrated in FIG. 16 when the terminal apparatus 10 is switched from the asynchronous mode to the synchronous mode. FIG. 16 is a flowchart illustrating an example of a process performed by the terminal apparatus 10 when the synchronous mode is switched to, from the asynchronous mode.

When the terminal apparatus 10 receives a user's operation to switch the asynchronous mode to the synchronous mode, the terminal apparatus 10 is switched back from the asynchronous mode to the synchronous mode in step S121. The synchronous-asynchronous manager 28 changes the current mode of the asynchronous mode to the synchronous mode.

In step S122, the conference processor 25 reads the page identification information of the page displayed in the synchronous mode recorded in step S113 of FIG. 15. Then, the conference processor 25 acquires the read download data corresponding to the page identification information of the page displayed in the synchronous mode from the storage area for the synchronous mode use of the page cache storage 27 in the asynchronous mode as illustrated in FIG. 11.

A specific method of determination includes comparing the page identification information of the page displayed in the synchronous mode and the page identification information of the download data saved in the page cache storage 27 in the asynchronous mode to see whether the page identification information of the page displayed in the synchronous mode matches the page identification information of the download data saved in the page cache storage 27 in the asynchronous mode.

Alternatively, a download data management table configured to manage page identification information corresponding to the already received download data may be prepared separately from the page cache storage 27, and the page identification information of the page displayed in the synchronous mode may be compared with the page identification information managed by the download data management table. Note that when the download data management table is used, it may be necessary to delete the page identification information managed by the download data management table in accordance with deleting the already received download data saved in the page cache storage 27.

In step S123, the page cache controller 26 changes the cache area in the asynchronous mode illustrated in FIG. 11 to the cache area in the synchronous mode illustrated in FIG. 10. Then, in step S124, the page cache controller 26 performs a process of FIG. 9 at any desired timing. Alternatively, the download data in the area for the asynchronous mode use in the cache area in the asynchronous mode illustrated in FIG. 11 may be discarded at the timing at which the asynchronous mode is switched back to the synchronous mode.

Hence, as a result of the process of FIG. 9, the download data in the area for the asynchronous mode use in the cache area in the asynchronous mode illustrated in FIG. 11 may be sequentially changed into the download data having the high likelihood of being required in the synchronous mode.

By performing the process of FIG. 16, when the terminal apparatus 10 is switched from the asynchronous mode to the synchronous mode, the terminal apparatus 10 may be able to sequentially change download data in the page cache storage 27 into download data having the high likelihood of being required in the synchronous mode.

Outline

The embodiment may be applied to the conference system 1 to proceed with a conference while attendees of the conference browse conference material electrically distributed to the attendees of the conference via their respective terminal apparatuses 10. The embodiment may also be applied to a seminar system or a class system, other than the conference system 1, to proceed with a seminar or class while attendees of the seminar or the class browse a seminar material or a class material electrically distributed to the attendees of the seminar or the class via their respective terminal apparatuses 10.

For example, in the conference system 1 that proceeds with a conference while attendees of the conference browse conference material that is electrically distributed to the attendees of the conference via their terminal apparatuses 10, it is desirable to quickly distribute the conference material to all the attendees of the conference in order to quickly start the conference to save time. Further, conferences held by the conference system 1 may include those conferences in which the conference material is distributed only to a limited number of appropriate attendees or those conferences in which the conference material needs to be collected at the end of the conference.

Thus, in the conference system 1, it may be important to distribute the conference material quickly and safely. In the conference system 1, the conference material is uploaded in advance in the conference server apparatus 12. The attendees of the conference log into the conference server apparatus 12 from their terminal apparatuses 10 at the start time of the conference. The attendees of the conference download the conference material into their terminal apparatuses 10. The conference starts after all the attendees of the conference finish downloading the conference material.

Note that in the conference system 1 of the embodiment, it is assumed that the conference material is downloaded after the start time of the conference because it is possible to correct or modify the conference material immediately before the start time of the conference, or because the conference material needs to be collected at the end of the conference. Accordingly, the conference system 1 of the embodiment may enable starting the conference in a short time that requires downloading the conference material after the start time of the conference.

Specifically, in the conference system 1 of the embodiment, the conference material is divided into units to be downloaded, and the conference has started at the time at which one of the divided units of the conference material has been downloaded. Accordingly, the conference system 1 of the embodiment may shorten a standby period until the conference starts compared to the conference system that needs to download all the conference material collectively. The remaining conference material may be downloaded from the conference server apparatus 12 into the attendees' terminal apparatuses 10 in the background process after the conference has started.

Further, the conference system 1 of the embodiment excels in security because the conference system 1 sequentially deletes the download data having the low likelihood of being subsequently required among the download data downloaded in each of the terminal apparatuses 10.

Further, the conference system 1 of the embodiment may implement the synchronous mode and the asynchronous mode in the terminal apparatuses 10 in the configuration in which the conference material is divided into units to be downloaded, and the conference has started at the time at which one of the divided units of the conference material has been downloaded.

According to the conference system 1 of the embodiment, the asynchronous mode may be implemented in the terminal apparatuses 10 without downloading all the conference material from the conference server apparatus 12 to the terminal apparatuses 10.

The present invention is not limited to examples or embodiments disclosed above. Various modifications or alteration may be made without departing from the scope of the claims of the present invention. Note that the conference server apparatus 12 is an example of an information processing apparatus described in the scope of the claims of the present application.

The conference system 1 is an example of an information processing system described in the scope of the claims. The download request part 24 is an example of a receiver described in the scope of the claims. The page cache storage 27 is an example of a transmission information storage described in the scope of the claims. The conference processor 25 is an example of a display processor described in the scope of the claims. The page cache controller 26 is an example of a transmission information storage controller described in the scope of the claims. A part to be displayed corresponds to a page or pages of the conference material described in the scope of the claims. The conference material storage 38 is an example of an information storage part described in the scope of the claims. The converter 35 is an example of a converter described in the scope of the claims. The synchronous mode is an example of a first setting described in the scope of the claims. The asynchronous mode is an example of a second setting described in the scope of the claims.

According to the embodiment, the conference system may be able to implement a setting for temporarily displaying information other than information specified by the information processing apparatus without awaiting the end of transmitting the information from the information processing apparatus to the terminal apparatuses.

Note that the conference system 1 of the embodiment is merely an example. Various examples of system configurations may be provided depending on the purpose or the intended use.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

The present application is based on Japanese Priority Application No. 2014-038930 filed on Feb. 28, 2014, the entire contents of which are hereby incorporated herein by reference.

What is claimed is:

1. A terminal apparatus having a synchronous mode synchronously displaying a conference material including a plurality of pastes with other terminal apparatuses and an asynchronous mode asynchronously displaying the conference material with the other terminal apparatuses, the terminal apparatus comprising:

a receiver configured to receive, from an information processing apparatus, download data of a first page and download data of a second page converted from the conference material, wherein the download data of the first page includes a page to be initially displayed when synchronously displaying the conference material among the terminal apparatuses, and the download data of the second page includes a part of the remaining pages other than the first page to be displayed in the conference material;

a transmission information storage configured to store the download data of the first page and the download data of the second page in a storage area; and processing circuitry configured to
display the download data of the first page according to the synchronous mode in which, when the terminal apparatus is in the synchronous mode, the terminal apparatus simultaneously displays the download data of the first page along with the other terminal apparatuses in the synchronous mode,
display the download data of the second page based on an operation performed on the terminal apparatus and according to the asynchronous mode in which, when the terminal apparatus is in the asynchronous mode, the terminal apparatus displays the download data of the second page while the other terminal apparatuses display information different than the download data of the second page;

control the transmission information storage to store the download data of the first page in a first storage area for a synchronous mode use of the storage area;

control the transmission information storage to store the download data of the second page based on the operation performed on the terminal apparatus in a second storage area for an asynchronous mode use of the storage area;

determine download data of first download candidates of a page displayed following the download data of the first page when the terminal apparatus is in the asynchronous mode and the first storage area has free space;

store the first candidates in the first storage area for the synchronous mode use of the transmission information storage;

determine download data of second candidates for download data of the second page downloaded from the information processing apparatus based on the operation performed by the terminal apparatus when the terminal apparatus is in the asynchronous mode and the second storage area has free space; and store the second candidates in the second storage area for the asynchronous mode use of the transmission information storage, wherein the processing circuitry changes the storage area of the transmission information storage used as the first storage area and the second storage area into another storage area of the transmission information storage used as only the first storage area when the terminal apparatus is switched from the synchronous mode to the asynchronous mode.

2. The terminal apparatus as claimed in claim 1, wherein the processing circuitry reads the download data of the first page in the first storage area to display the download data of the first page when the terminal apparatus is switched from the synchronous mode to the asynchronous mode.

3. The terminal apparatus as claimed in claim 1, wherein the receiver receives download data based on an information transmission type determined between the terminal apparatus and the information processing apparatus, the information transmission type including a dividing unit of the information, a data format of transmission information, and a display size of the transmission information.

4. The terminal apparatus as claimed in claim 3, wherein the information transmission type is determined for each of the terminal apparatuses.

5. The terminal apparatus as claimed in claim 1, wherein the receiver is configured to receive the download data of the second page after the processing circuitry displays the download data of the first page.

6. The terminal apparatus as claimed in claim 1, wherein the synchronous mode is a shared viewing mode, and the asynchronous mode is a private viewing mode.

7. An information processing system including an information processing apparatus and a terminal apparatus connected to the information processing apparatus via a network, the terminal apparatus having a synchronous mode synchronously displaying a conference material including a plurality of pages with other terminal apparatuses and an asynchronous mode displaying the conference material with the other terminal apparatuses, the information processing system comprising:

an information storage configured to store the conference material;

a converter configured to convert the conference material into download data of a first page and download data of a second page to be transmitted to the terminal apparatus;

a receiver configured to receive the download data of the first page and the download data of the second page, wherein the download data of the first page includes a page to be initially displayed when synchronously displaying the conference material among the terminal apparatuses, and the download data of the second page includes a part of the remaining pages other than the first page to be displayed in the conference material;

a transmission information storage configured to store the download data of the first page and the download data of the second page; and processing circuitry configured to control the terminal apparatus to display the download data of the first page according to the synchronous mode in which, when the terminal apparatus is in the synchronous mode, the terminal device simultaneously displays the download data of the first page alone with the other terminal devices in the synchronous mode, display the download data of the second page based on an operation performed on the terminal apparatus and according to the asynchronous mode in which, when the terminal apparatus is in the asynchronous mode, the terminal device displays the download data of the second page while the other terminal devices display information different than the download data of the second page;

control the transmission information storage to store the download data of the first page in a first storage area for a synchronous mode use;

control the transmission information storage to store the download data of the second page based on the operation performed on the terminal apparatus in a second storage area for an asynchronous mode use, the first storage area and the second storage area are in the terminal apparatus;

determine download data of first download candidates of a page displayed following the download data of the first page when the terminal apparatus is in the asynchronous mode and the first storage area has free space;

store the first candidates in the first storage area for the synchronous mode use of the transmission information storage;

determine download data of second candidates for download data of the second page downloaded from the information processing apparatus based on the operation performed by the terminal apparatus when the terminal apparatus is in the asynchronous mode and the second storage area has free space; and store the second candidates in the second storage area for the asynchronous mode use of the transmission information storage, wherein the processing circuitry changes the storage area of the transmission information storage used as the first storage area and the second storage area into another storage area of the transmission information storage used as only the first storage area when the terminal apparatus is switched from the synchronous mode to the asynchronous mode.

8. The information processing system as claimed in claim 7, wherein the processing circuitry reads the download data of the first page in the first storage area to control the terminal apparatus to display the download data of the first page when the terminal apparatus is switched from the synchronous mode to the asynchronous mode.

9. The information processing system as claimed in claim 7, wherein
the synchronous mode is a shared viewing mode, and
the asynchronous mode is a private viewing mode.

10. An information transmission method executed by a terminal apparatus, the terminal apparatus having a synchronous mode synchronously displaying a conference material including a plurality of pages with other terminal apparatuses and an asynchronous mode asynchronously displaying the conference material with the other terminal apparatuses, the information transmission method comprising:
receiving, by a receiver from an information processing apparatus, download data of a first page and download data of a second page converted from the conference material, wherein the download data of the first page includes a page to be initially displayed when synchronously displaying the conference material among the terminal apparatuses, and the download data of the second page includes a part of the remaining pages other than the first page to be displayed in the conference material;
storing, in a storage area of a transmission information storage, the download data of the first page and the download data of the second page;
displaying, by processing circuitry, the download data of the first page according to the synchronous mode in which, when the terminal apparatus is in the synchronous mode, the terminal device simultaneously displays the download data of the first page along with the other terminal apparatuses in the synchronous mode;
displaying, by the processing circuitry, the download data of the second page based on an operation performed on the terminal apparatus and according to the asynchronous mode in which, when the terminal apparatus is in the asynchronous mode, the terminal apparatus displays the download data of the second page while the other terminal apparatuses display information different than the download data of the second page;
controlling, by the processing circuitry, the transmission information storage to store the download data of the first page in a first storage area for a synchronous mode use of the storage area;
controlling, by the processing circuitry, the transmission information storage to store the download data of the second page based on the operation performed on the terminal apparatus in a second storage area for an asynchronous mode use of the storage area;
determining, by the processing circuitry, download data of first download candidates of a page displayed following the download data of the first page when the terminal apparatus is in the asynchronous mode and the first storage area has free space;
storing the first candidates in the first storage area for the synchronous mode use of the transmission information storage;
determining, by the processing circuitry, download data of second candidates for download data of the second page downloaded from the information processing apparatus based on the operation performed by the terminal apparatus when the terminal apparatus is in the asynchronous anode and the second storage area has free space; and
storing the second candidates in the second storage area for the asynchronous mode use of the transmission information storage,
wherein in the controlling, the processing circuitry changes the storage area of the transmission information storage used as the first storage area and the second storage area into another storage area of the transmission information storage used as only the first storage area when the terminal apparatus is switched from the synchronous mode to the asynchronous mode.

11. The information transmission method as claimed in claim 10, wherein in the displaying, the processing circuitry reads the download data of the first page in the first storage area to display the download data of the first page when the terminal apparatus is switched from the synchronous mode to the asynchronous mode.

12. The information transmission method as claimed in claim 10, wherein in the receiving, the receiver receives the download data based on an information transmission type determined between the terminal apparatus and the information processing apparatus, the information transmission type including a dividing unit of the information, a data format of transmission information, and a display size of the transmission information.

13. The information transmission method as claimed in claim 12, wherein the information transmission type is determined for each of the terminal apparatuses.

14. The information transmission method as claimed in claim 10, wherein in the receiving, the receiver receives the download data of the second page after the processing circuitry displays the download data of the first page.

15. The information transmission method according to claim 10, wherein
the synchronous mode is a shared viewing mode, and
the asynchronous mode is a private viewing mode.

* * * * *